United States Patent Office 3,198,396
Patented Aug. 3, 1965

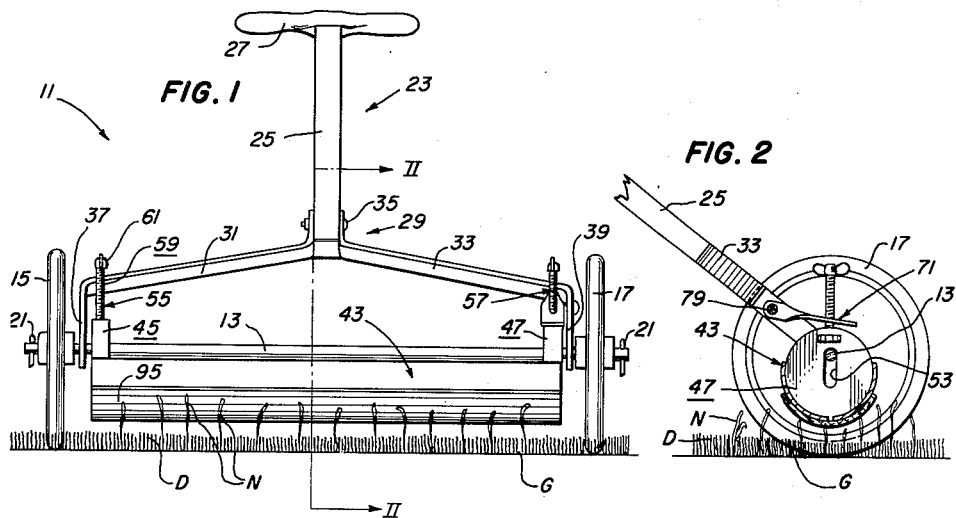
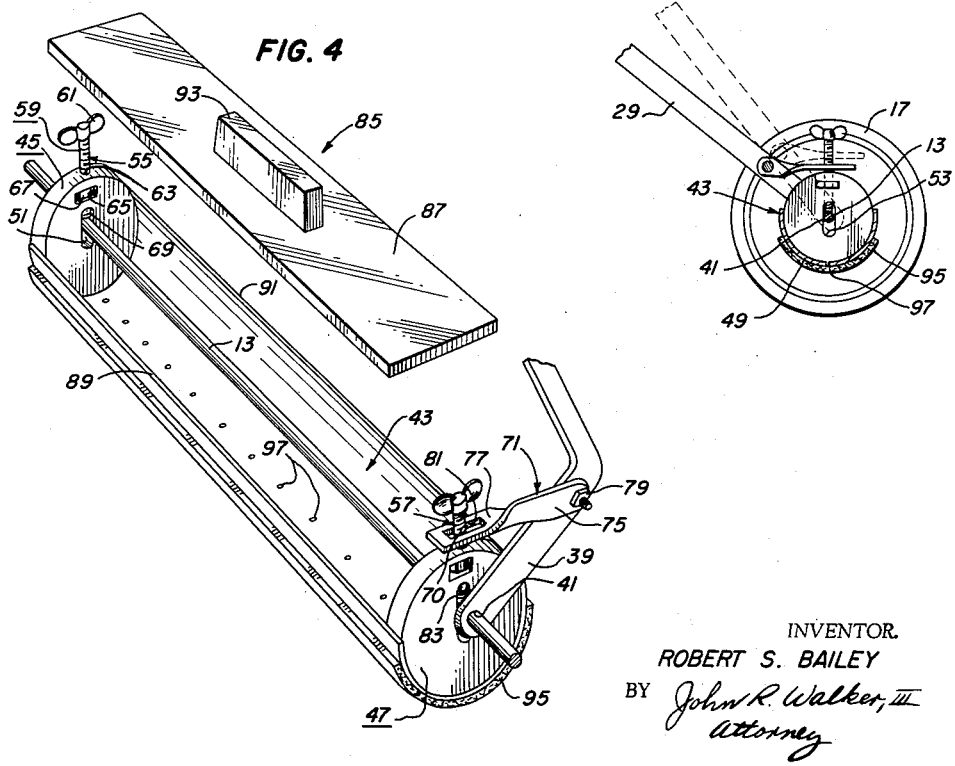

3,198,396
MEANS FOR KILLING NUT GRASS
Robert S. Bailey, 2039 Cowden, Memphis, Tenn.
Filed Apr. 9, 1963, Ser. No. 271,748
2 Claims. (Cl. 222—176)

This invention relates to a method for killing nut grass in a lawn and a device for accomplishing same.

It is well known that nut grass, which is an undesirable grass, is very difficult to get rid of in a lawn. The common practice is either to pull the nut grass up or dig it up, and neither of these means is entirely satisfactory. For example, when the nut grass is pulled up, many times the roots or nut from the grass is left in the ground from which additional blades will sprout. Also, in digging up the nut grass, there is a possibility of leaving some of the roots or nut in the ground, which will cause further sprouting of the grass. Additionally, pulling or digging up nut grass is a time consuming job, and once nut grass has began to spread in a lawn, it is very difficult, if not impossible, to completely eliminate it. In addition, when the nut grass is pulled or dug up, unsightly holes are left in the lawn.

The present invention is directed towards providing a means and method for overcoming the above-mentioned and other problems in the elimination of nut grass from a lawn.

Therefore, one of the important objects of the present invention is to provide a method for killing the unwanted nut grass in a very effective manner.

A further object is to provide such a method which eliminates the nut grass without damaging the desirable grass.

A further object is to provide such a method that requires much less time and effort than previous methods.

A further object is to provide a unique device for killing nut grass.

A further object is to provide such a device which includes a trough for containing weed poison and which has a pad on the bottom thereof that receives the poison from the trough.

A further object is to provide such a device which has means for carrying the above-mentioned pad in spaced relationship over the lawn so that the pad engages the blades of nut grass and yet is spaced above the desirable grass to cause the weed poison to run down the nut grass for the killing thereof.

A further object is to provide such a device that is simple in construction and inexpensive to manufacture.

A further object is to provide such a device that is convenient and easy to use.

A further object is to provide means in such a device for varying the spacing above the ground.

A further object is generally to improve the method and means for killing nut grass.

The means by which the foregoing and other objects of the present invention are accomplished and the manner of their accomplishment will be readily understood from the following specification upon reference to the accompanying drawings, in which:

FIG. 1 is a front elevational view of the device of the present invention, shown in use in killing nut grass.

FIG. 2 is a fragmentary sectional view taken as on the line II—II of FIG. 1.

FIG. 3 is a view similar to FIG. 2 showing the device adjusted at a different height and showing in dotted lines a pivoted position of the handle.

FIG. 4 is a fragmentary perspective view of the device and showing a cover for the trough thereof.

Referring now to the drawings in which the various parts are indicated by numerals, the device 11 of the present invention comprises a horizontally and transversely extending axle 13 and a pair of wheels 15, 17 respectively rotatably mounted on opposite ends of the axle, and held thereon by cotter keys 21.

A handle 23 is provided and preferably includes an elongated shank portion 25, a transverse handgrip portion 27 attached to the upper end of the shank portion, and a bifurcated lower portion 29 that preferably includes a pair of brackets 31, 33 which are fixedly attached to the lower end of shank portion 25 as by bolt and nut means 35. Brackets 31, 33 preferably extend outwardly and downwardly from shank portion 25 in diverging relationship and are respectively provided with downturned portions 37, 39 at the lower ends thereof. Each of downturned portions 37, 39 is provided with an aperture 41 therethrough, which apertures are in lateral alignment with one another and through which extend the opposite ends of axle 13 so that handle 23 is pivotable relative to axle 13, as shown by the solid and dotted line positions of the handle in FIG. 3. Also, it should be noted that the downturned portions 37, 39 are respectively positioned just inside of wheels 15, 17 on the axle 13, as best seen in FIG. 1.

A trough 43 for carrying the weed posion is carried by axle 13. Trough 43 preferably comprises a pair of spaced apart and circular ends 45, 47 and a rounded bottom 49 that is fixedly attached adjacent opposite ends by suitable means to ends 45, 47 to rigidly interconnect the ends. Bottom 49 extends generally horizontally and is preferably in the shape of a portion of a hollow cylinder and opens upwardly. In other words, bottom 49 is substantially U-shaped in cross-section and extends over the lower half of ends 45, 47. Vertically exteding slots 51, 53 are respectively provided through ends 45, 47, through which slots axle 13 loosely extends. It will be noted that trough 43 transversely extends across a major portion of the device 11 between downturned portions 37, 39, with ends 45, 47 being respectively adjacent the downturned portions.

A pair of adjustment mechanisms 55, 57 are respectively provided at the opposite ends of trough 43 to adjust the height of the trough above the ground G. Adjustment mechanisms 55, 57 are substantially identical, and the following description of adjustment mechanism 55 will suffice for both. Adjustment mechanism 55 preferably comprises an adjustment screw 59 having a winged head 61 fixedly attached at the upper end thereof. Adjustment screw 59 extends through a vertical bore 63 provided in end 45, and which bore extends from the upper edge of end 45 to slot 51. A transversely extending slot 65 is provided through end 45 and is in communication with bore 63 intermediate the upper and lower ends thereof. A nut 67 is received in slot 65 and held therein against turning by suitable means. Screw 59 threadedly extends through nut 67, and the lower end 69 of screw 59 engages axle 13 to pivotally and adjustably support one end of trough 43 from axle 13. The other end of trough 43 is pivotally and adjustably supported from axle 13 by adjustment screw 70, which corresponds with adjustment screw 59. It will be understood that by turning adjustment screws 59, 70, the trough 43 can be moved from a lowered position, as shown in FIG. 2, to a raised position, as best seen in FIG. 3. It will be understood that adjustment mechanisms 55, 57 are preferably adjusted by the same amount so that bottom 49 remains in substantial parallel spaced relationship above ground G.

A holding member 71 is provided on downturned portion 39. Holding member 71 is formed from a piece of material that is twisted in such a manner that one end, as at 75, is disposed vertically and the opposite end, as at 77, is disposed horizontally. End 75 is pivotally mounted from downturned portion 39 by suitable means, as the bolt and nut means 79 that extends through aligned apertures in the downturned portion and end 75. End 77 is provided with an elongated opening 81 through which screw 70 extends. It will be understood that the elongated opening 81 allows pivoting movement between certain limits of handle 23 relative to axle 13 to accommodate different positions of the handle, as, for example, with people of different heights, and yet trough 43 is permitted to remain in an upright position regardless of the position of the handle between these limits. Trough 43 is freely pivotally supported at two points, namely, at the lower end 69 of adjustment screw 59 and at the lower end 83 of adjustment screw 70. The center of gravity of the trough is below these suspension points so that the trough has a tendency at all times to remain upright, that is, with the open portion upwardly so that the poison will not spill therefrom.

A top 85 is provided and preferably includes a substantially rectangular and horizontal flat piece 87 that rests on the upper edges 89, 91 of bottom 49 between ends 45, 47. In addition, top 85 preferably includes a handle 93 fixedly attached to piece 87.

A pad 95 is preferably formed of cloth or some fibrous material which will absorb the weed poison, can be saturated thereby, and through which the poison can pass. Pad 95 is fixedly attached to the lower surface of bottom 49 and preferably extends a major portion therearound and extends from end to end thereof. Bottom 49 is preferably provided with a plurality of small holes 97 therethrough, with the holes preferably being transversely aligned across the bottom in spaced relationship, as best seen in FIG. 4. Thus, the poison placed in trough 43 will slowly drain through holes 97 and will saturate pad 95.

The best time to use the device 11 of the present invention is approximately 36 to 48 hours after the lawn has been cut. The nut grass at this time will be about ½ inch to 1 inch taller than the desirable grass, and in the drawings the nut grass has been indicated as at N and the desirable grass as at D. First, by means of the adjustment mechanisms 55, 57, the trough 43 is raised or lowered so that pad 95 will drag over the nut grass N but will not touch the desirable grass D when the device 11 is rolled over the lawn. With the device 11 properly set, as above described, the device is next placed on a driveway or sidewalk adjacent the lawn to be treated. Top 85 is removed, and a quantity of weed poison or other poison suitable for killing nut grass, as, for example, one quart of a poison which includes alkanolamine salts (of the ethanol and isopropanol series) of 2,4-dichlorophenoxyacetic acid, is poured into the trough 43 and the top is replaced. The bottom of pad 95 should be watched, and when the weed poison is dripping freely the full length of the pad, it is ready to use. Next, device 11 is rolled back and forth across the lawn in the same manner as a lawnmower. The drops of weed poison will break and run down the blades of nut grass as they rub against the saturated pad 95. If the lawn is thickly infested with nut grass, it will be necessary to roll more slowly than if only sparsely infested. A few trips across the lawn will determine the proper speed. Top 85 is preferably kept on trough 43 while in use to keep out tiny insects that will stop up the small metering holes 97 in the bottom of trough 43. After the lawn has been treated, as above described, the lawn should not be cut for approximately five days. In the event that it rains within twelve hours after treatment, the lawn should be treated again. In addition, the above procedure should be repeated each week for three to four weeks, or as long as nut grass appears on the lawn. Since there are nut grass roots throughout the lawn that have not sprouted, there will be new blades of nut grass appearing from time to time. These new blades should be poisoned as quickly as possible to prevent further spreading.

Although the invention has been described and illustrated with respect to a preferred embodiment thereof, it is to be understood that it is not to be so limited since changes and modifications may be made therein which are within the full intended scope of this invention as hereinafter claimed.

I claim:
1. A device for killing nut grass comprising an axle, wheels mounted on said axle for supporting said axle for movement over the ground, a handle including a bifurcated lower portion having apertures therethrough receiving said axle for pivotally mounting said handle relative to said axle, a trough for holding poison therein, said trough including a pair of spaced apart ends and a rounded bottom interconnecting said ends, each of said ends including a vertical slot through which said axle loosely extends; a pair of adjustment means respectively at said ends; each of said adjustment means including an adjustment screw, a nut fixedly attached to one of said ends, said screw being threadedly engaged in said nut with the end of said screw engaging said axle to pivotally support said trough therefrom with said bottom thereof being spaced above the ground at a height greater than the height of the desirable grass and lower than the nut grass; a pad attached to the lower side of said bottom and extending substantially along the length thereof, said bottom being provided with a plurality of holes therethrough whereby poison is adapted to drain from said trough through said holes and onto said pad where it is adapted to be transferred to the nut grass as the trough is moved over the ground.

2. The device of claim 1 in which a holding member is pivotally attached to said bifurcated lower portion of said handle, and said holding member being provided with an elongated opening through which said adjustment screw extends to limit pivoting movement of said trough.

References Cited by the Examiner

UNITED STATES PATENTS

| | | | |
|---|---|---|---|
| 2,158,115 | 5/39 | Fullilove | 47—1.5 |
| 2,767,887 | 10/56 | Bond et al. | 222—177 |
| 2,807,530 | 9/57 | Barrons | 71—2.7 |
| 2,906,437 | 9/59 | Wallis | 222—177 |
| 2,941,879 | 6/60 | Goodhue | 71—2.7 |
| 3,021,642 | 2/62 | Ewing | 47—1.5 |
| 3,077,701 | 2/63 | Osman | 47—1.5 |

LOUIS J. DEMBO, *Primary Examiner.*